US010641623B2

(12) United States Patent
Ikeda

(10) Patent No.: US 10,641,623 B2
(45) Date of Patent: May 5, 2020

(54) ONBOARD DETECTOR INCLUDING CABLE AND SENSOR MODULE INCLUDING SENSOR, HOUSING MEMBER AND MOLDED ARTICLE

(71) Applicant: Hitachi Metals, Ltd., Tokyo (JP)

(72) Inventor: Yukio Ikeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 281 days.

(21) Appl. No.: 15/640,630

(22) Filed: Jul. 3, 2017

(65) Prior Publication Data

US 2018/0010933 A1 Jan. 11, 2018

(30) Foreign Application Priority Data

Jul. 8, 2016 (JP) ................ 2016-135958

(51) Int. Cl.
*G01D 11/24* (2006.01)
(52) U.S. Cl.
CPC ................. *G01D 11/245* (2013.01)
(58) Field of Classification Search
CPC ................................................ G01D 11/245
See application file for complete search history.

(56) References Cited

U.S. PATENT DOCUMENTS

| | | | | |
|---|---|---|---|---|
| 4,841,157 A | * | 6/1989 | Downing, Jr. | ......... G01N 21/53 250/574 |
| 6,109,979 A | * | 8/2000 | Garnett | ................ H01R 13/527 439/573 |
| 8,941,374 B2 | * | 1/2015 | Takasaki | ................. G01P 3/487 324/207.11 |
| 2002/0125417 A1 | * | 9/2002 | Damaschke | ........ B29C 45/1671 250/239 |
| 2003/0146819 A1 | * | 8/2003 | Shibayama | .............. G01K 7/22 338/22 R |
| 2005/0126308 A1 | * | 6/2005 | Tsuge | ...................... G01P 1/026 73/862.322 |

(Continued)

FOREIGN PATENT DOCUMENTS

JP 2014-238354 A 12/2014

OTHER PUBLICATIONS

French Preliminary Search Report dated Jan. 17, 2020 for French Patent Application No. FR1756414 and English Translation thereof.

*Primary Examiner* — Natalie Huls
(74) *Attorney, Agent, or Firm* — McGinn IP Law Group, PLLC.

(57) ABSTRACT

An onboard detector includes a cable including plural electric wires and a sensor module provided at an end of the cable. The sensor module includes a sensor, a housing member and a molded article. The sensor includes a sensor main body including a detecting element and plural lead wires electrically connected to the electric wires. The housing member includes a joint housing portion that houses joints of the electric wires and the lead wires. The molded article includes molding resin that is molded so as to cover at least a portion of the housing member and so as not to come into contact with the sensor main body. The joint housing portion includes a wire holding wall holding the electric wires and a sensor holding wall holding the lead wires so as to hold the sensor.

10 Claims, 7 Drawing Sheets

(56) References Cited

U.S. PATENT DOCUMENTS

| | | | |
|---|---|---|---|
| 2006/0260418 A1* | 11/2006 | Tsuge | G01D 11/245 73/862.331 |
| 2009/0078043 A1* | 3/2009 | Tsuda | B29C 45/1671 73/431 |
| 2009/0145222 A1* | 6/2009 | Takayama | G01D 11/245 73/488 |
| 2010/0040315 A1* | 2/2010 | Ozaki | G01R 33/0005 384/446 |
| 2010/0067725 A1* | 3/2010 | Schumaier | H04R 25/456 381/330 |
| 2012/0306484 A1* | 12/2012 | Mizutani | G01D 5/145 324/244 |
| 2013/0154626 A1* | 6/2013 | Takasaki | G01D 11/245 324/207.25 |
| 2014/0053646 A1* | 2/2014 | Takasaki | G01D 11/245 73/431 |
| 2014/0077794 A1* | 3/2014 | Takiguchi | G01D 5/145 324/207.13 |
| 2014/0165727 A1* | 6/2014 | Mueller | G01D 11/245 73/514.39 |
| 2014/0320113 A1* | 10/2014 | Adachi | G01P 1/026 324/207.2 |
| 2015/0158220 A1* | 6/2015 | Ikeda | G01D 11/245 324/71.1 |
| 2015/0177025 A1* | 6/2015 | Mizunuma | G01D 5/14 324/207.25 |
| 2015/0211902 A1* | 7/2015 | Fink | G01D 11/245 73/431 |
| 2015/0364231 A1* | 12/2015 | Takahashi | G01D 11/245 174/70 R |
| 2016/0124056 A1* | 5/2016 | Ikeda | G01P 3/443 324/207.2 |
| 2016/0161286 A1* | 6/2016 | Oeda | G01D 5/145 324/207.2 |
| 2017/0184418 A1* | 6/2017 | Ikeda | B60R 16/0215 |
| 2019/0170498 A1* | 6/2019 | Ito | G01B 7/30 |
| 2019/0170499 A1* | 6/2019 | Ito | G01B 7/30 |

* cited by examiner

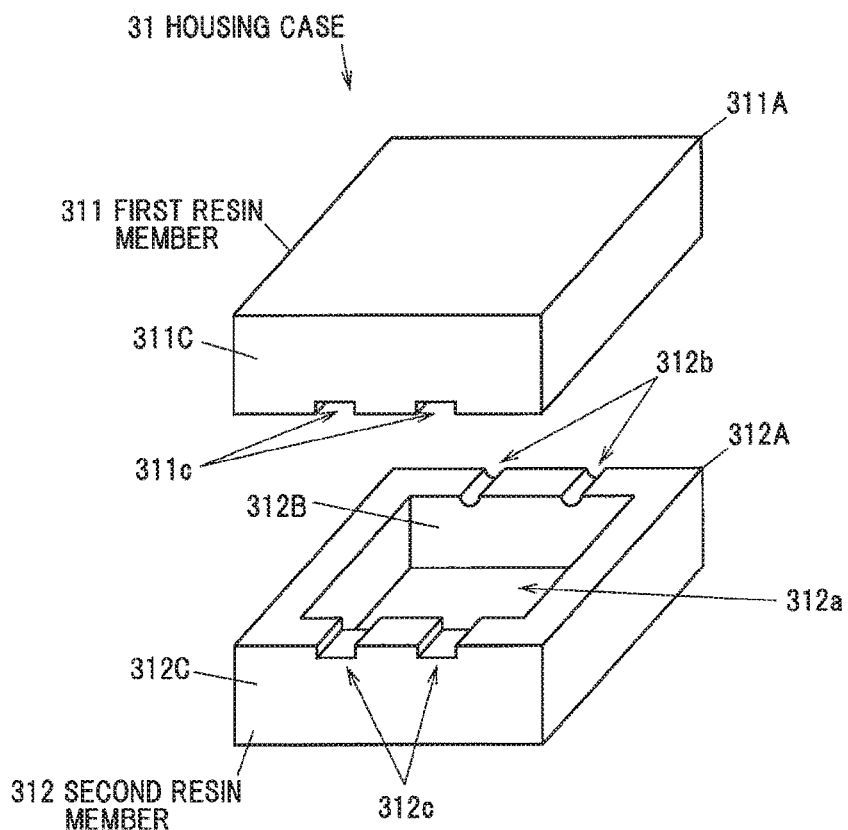
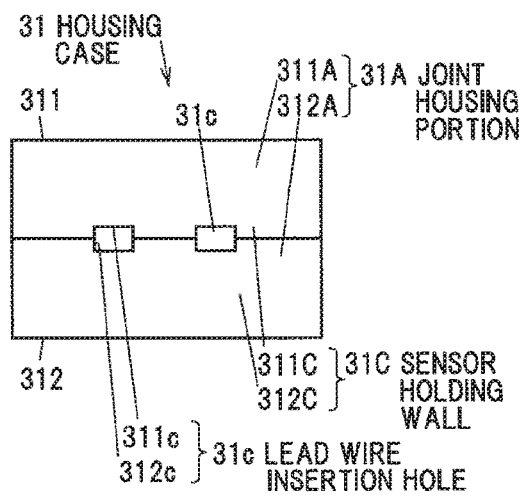
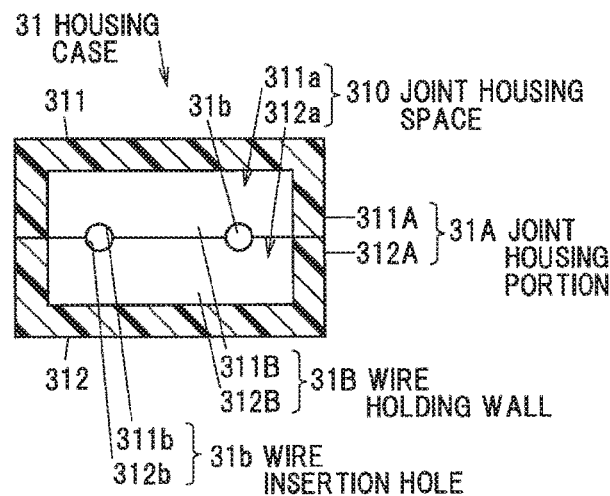

ONBOARD DETECTOR INCLUDING CABLE AND SENSOR MODULE INCLUDING SENSOR, HOUSING MEMBER AND MOLDED ARTICLE

The present application is based on Japanese patent application No. 2016-135958 filed on Jul. 8, 2016, the entire contents of which are incorporated herein by reference.

BACKGROUND OF THE INVENTION

1. Field of the Invention

The invention relates to an onboard detector which has a sensor for detecting a magnetic field or a state quantity such as temperature.

2. Description of the Related Art

An onboard detector to be mounted on vehicles such as automobiles is known which is provided with a sensor that detects a magnetic field or a state quantity such as temperature and that is covered by a molded resin (see e.g. JP-A-2014-238354).

Specific examples of such onboard detector are, e.g., a torque detector for detecting torque applied to a vehicle steering wheel based on a change in strength of magnetic field detected by a Hall IC, and a rotation detector for detecting wheel rotation.

SUMMARY OF THE INVENTION

In manufacturing the onboard detector provided with a sensor covered by a molded resin, the molded resin is formed by pouring a molten resin into a mold in which the sensor is placed. Since the molten resin is hot, e.g., 270° C., the sensor such as Hall IC may be affected by the heat and defects such as a decrease in detection accuracy may occur.

Also, the sensor of the onboard detector is provided with electric wires connected thereto for power supply and signal output. The joint between the sensor and the electric wires may be damaged by the resin poured into the mold, whereby defects such as wire breakage or connection failure may occur.

Furthermore, the onboard detector for being mounted on vehicles such as automobiles is required to have vibration resistance so that defects such as wire breakage do not occur at the joints between the sensor and the electric wires even when vibration is repeatedly applied. The onboard detector is also required to have heat resistance so that defects such as wire breakage do not occur at the joints between the sensor and the electric wires even when the molded resin expands and contracts due to heat.

Thus, it is an object of the invention to provide an onboard detector that is excellent in vibration resistance and heat resistance while preventing the defects caused by the molding of the resin.

According to an embodiment of the invention, an onboard detector comprises:

a cable comprising a plurality of electric wires; and
a sensor module provided at an end of the cable,
wherein the sensor module comprises a sensor, a housing member and a molded article,
wherein the sensor comprises a sensor main body including a detecting element and a plurality of lead wires extending out of the sensor main body and electrically connected to the plurality of electric wires,
wherein the housing member comprises a joint housing portion that houses a plurality of joints at which the plurality of electric wires are electrically connected to the plurality of lead wires,
wherein the molded article comprises a molding resin that is molded so as to cover at least a portion of the housing member and so as not to come into contact with the sensor main body, and
wherein the joint housing portion comprises a wire holding wall holding the electric wires and a sensor holding wall holding the lead wires so as to hold the sensor.

Effects of the Invention

According to an embodiment of the invention, an onboard detector can be provided that is excellent in vibration resistance and heat resistance while preventing the defects caused by the molding of the resin.

BRIEF DESCRIPTION OF THE DRAWINGS

Next, the present invention will be explained in more detail in conjunction with appended drawings, wherein:

FIGS. 5A to 5C are diagrams illustrating the housing case, wherein FIG. 5A is an exploded perspective view, FIG. 5B is a plan view when viewed from the side where a sensor main body is provided, and FIG. 5C is a cross sectional view thereof;

DETAILED DESCRIPTION OF THE PREFERRED EMBODIMENTS

First Embodiment

The first embodiment of the invention will be described below in conjunction with the appended drawings.

Figure 1:
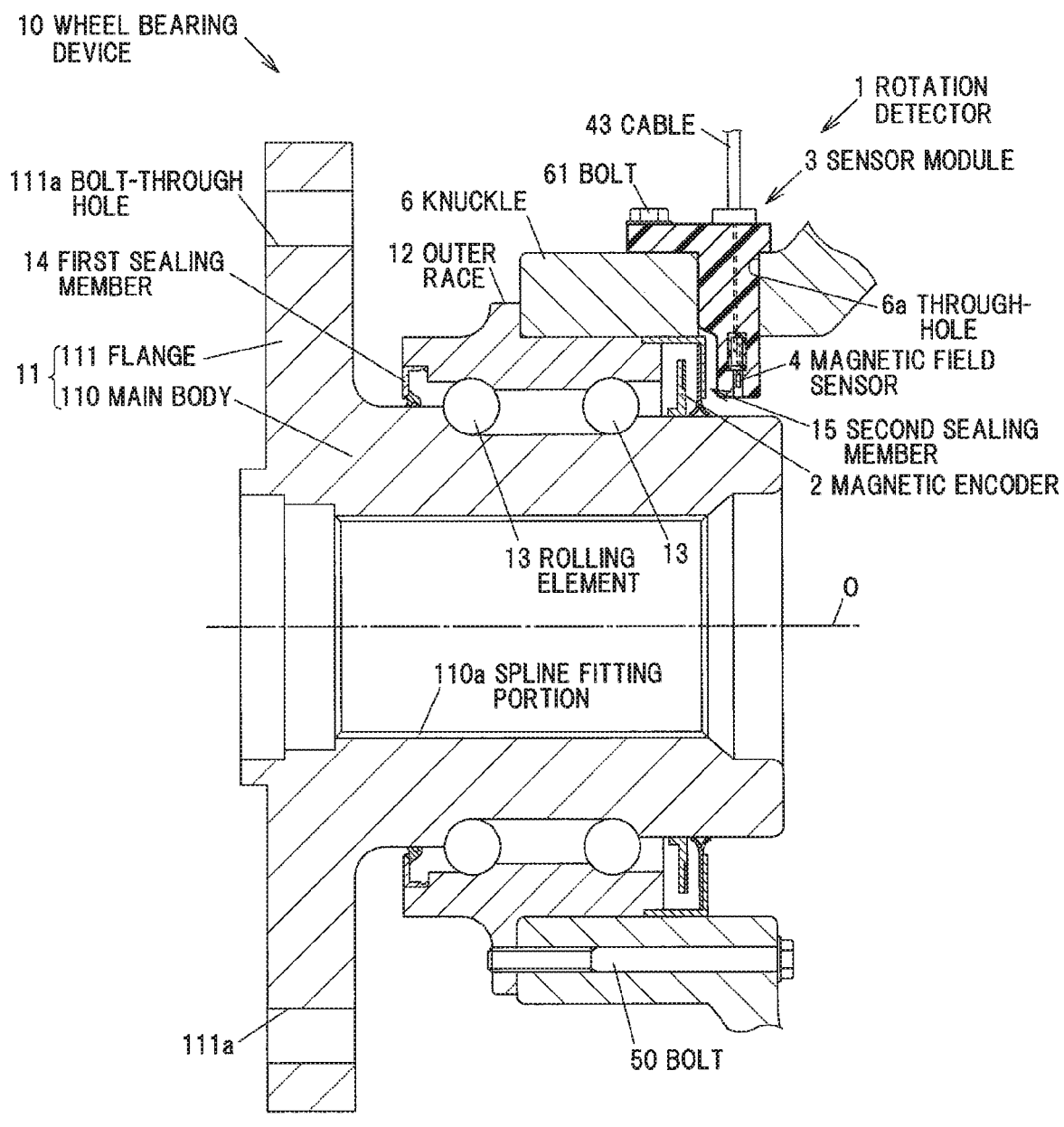
FIG. 1 is a cross sectional view showing a rotation detector as an onboard detector in the first embodiment of the present invention and a configuration example of a vehicle wheel bearing device having the rotation detector.
Figure 2:
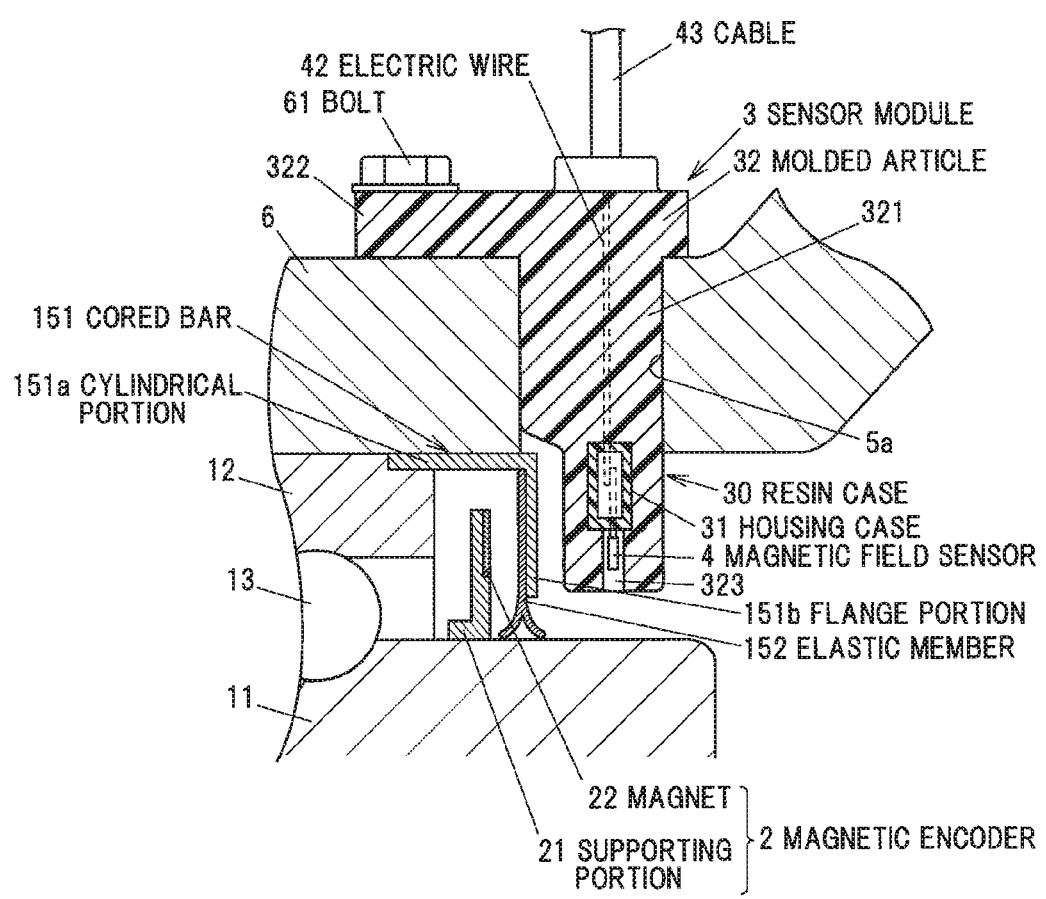
FIG. 2 is a partial enlarged view of FIG. 1.
Figure 3:
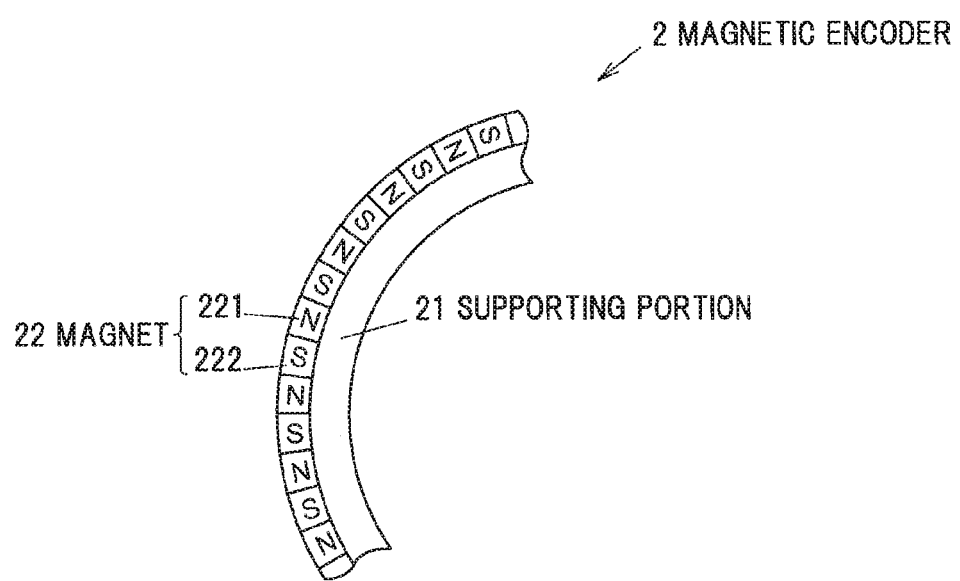
FIG. 3 is a partial enlarged view showing a magnet.

FIG. 1 is a cross sectional view showing a rotation detector 1 as an onboard detector in the first embodiment of the invention and a configuration example of a vehicle wheel bearing device 10 having the rotation detector 1. FIG. 2 is a partial enlarged view of FIG. 1. FIG. 3 is a partial enlarged view showing a magnet 22.

Configuration of the Wheel Bearing Device 10

The wheel bearing device 10 is provided with an inner race 11 having a cylindrical main body 110 and a flange 111 to be attached to a wheel, an outer race 12 arranged on the outer peripheral side of the main body 110 of the inner race 11, plural rolling elements 13 arranged between the inner race 11 and the outer race 12, and the rotation detector 1 for detecting a rotating speed of the inner race 11 with respect to the outer race 12.

A spline fitting portion 110*a* for coupling a drive shaft along a rotational axis O of the inner race 11 is formed at the middle portion of the main body 110 of the inner race 11. The flange 111 of the inner race 11 is formed integrally with the main body 110 so as to protrude radially outward of the main body 110. The flange 111 has plural bolt-through holes 111*a* into which bolts for attachment to a wheel (not shown) are press-fitted.

The outer race 12 is formed in a cylindrical shape and is fixed, by plural bolts 50 (only one bolt 50 is shown in FIG. 1), to a knuckle 6 which is coupled to a vehicle body via a suspension device. A through-hole 6*a* for attaching a sensor module 3 (described later) is formed on the knuckle 6.

An annular space between the inner race 11 and the outer race 12 is sealed with a first sealing member 14 and a second sealing member 15. The first sealing member 14 is arranged on the side where the flange 111 of the inner race 11 is located, and the second sealing member 15 is arranged on the opposite side (on the vehicle body side). The second sealing member 15 is composed of a cored bar 151 having an L-shaped cross section and an elastic member 152 bonded to the cored bar 151 by vulcanization bonding, and a cylindrical portion 151*a* of the cored bar 151 on the outer circumference is press-fitted onto the outer peripheral surface of the outer race 12. The elastic member 152 is bonded to a flange portion 151*b* extending inward from an edge of the cylindrical portion 151*a* by, e.g., vulcanization bonding. The cored bar 151 is formed of a non-magnetic metal such as austenitic stainless steel or aluminum.

Configuration of the Rotation Detector 1

The rotation detector 1 has a magnetic encoder 2 fixed to the outer surface of the main body 110 of the inner race 11, a sensor module 3 for detecting magnetic field variation with rotation of the magnetic encoder 2, and a cable 43 extending out of the sensor module 3 and having plural electric wires 42.

The magnetic encoder 2 has an annular non-magnetic supporting portion 21 fixed to the outer surface of the main body 110 of the inner race 11, and an annular magnet 22 supported by the supporting portion 21. The magnet 22 has plural N-poles 221 and plural S-poles 62 alternately arranged along the circumference as shown in FIG. 3, and rotates together with the wheel and the inner race 11.

The sensor module 3 is integrally provided at an end of the cable 43. The sensor module 3 has a resin case 30 and a magnetic field sensor 4. The magnetic field sensor 4 is one aspect of the "sensor" of the invention. The sensor module 3 is fixed to the knuckle 6 by a bolt 61.

The resin case 30 has a housing case 31 formed of a resin and a molded article 32 formed of a molding resin which is molded to cover at least a portion of the housing case 31. The housing case 31 is one aspect of the "housing member" of the invention. The housing case 31 will be described in detail later.

The rotation detector 1 is configured that the magnetic field sensor 4 of the sensor module 3 detects magnetic field strength varying with rotation of the magnetic encoder 2 and a signal corresponding to the magnetic field strength is output. When the wheel rotates, the inner race 11 and the magnetic encoder 2 rotate about the rotational axis O with the rotation of the wheel and this causes variation in strength of the magnetic field of the magnetic encoder 2 detected by the magnetic field sensor 4. It is possible to obtain a rotating speed of the wheel based on the cycle of change in the signal output from the rotation detector 1.

Configuration of the Sensor Module 3

Figure 4A:
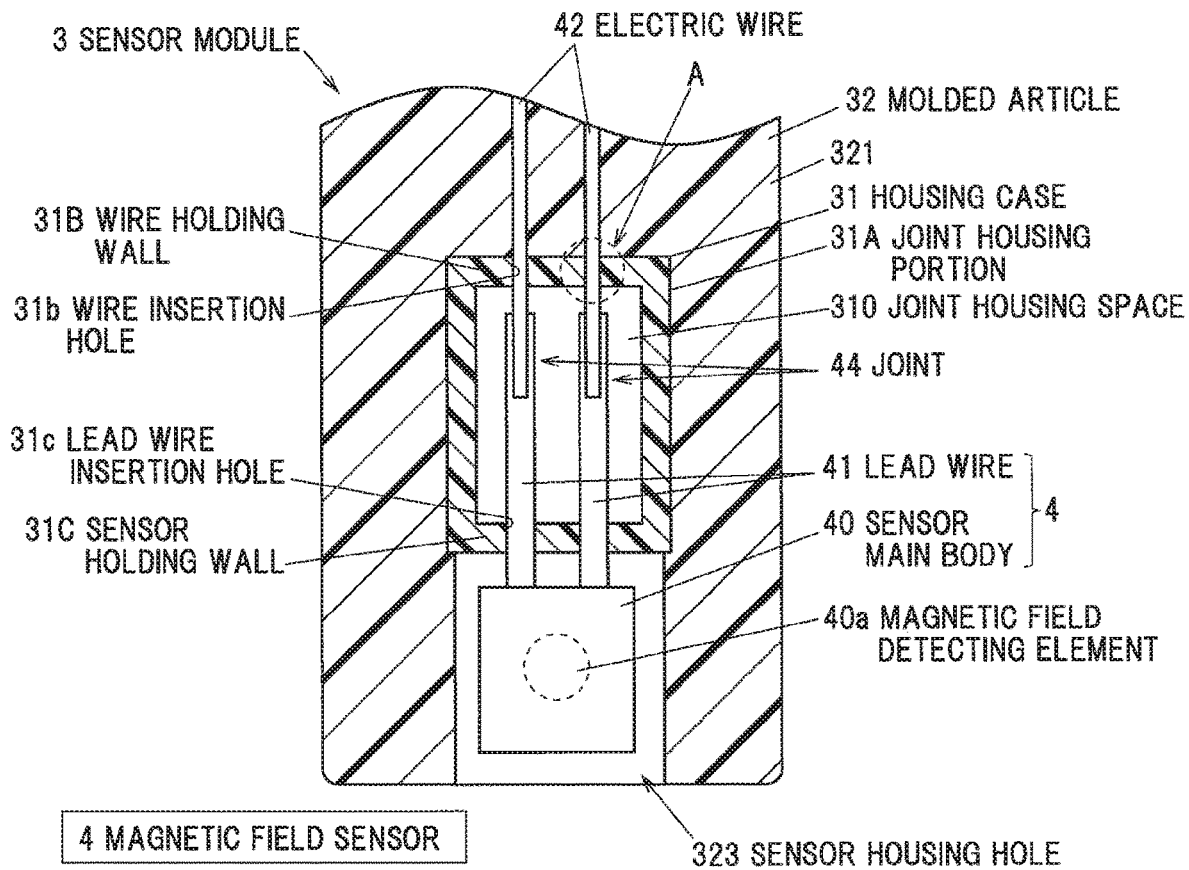
FIG. 4A is a cutaway diagram illustrating a sensor module in which a molded article and a housing case are shown as the cross section.
Figure 4B:
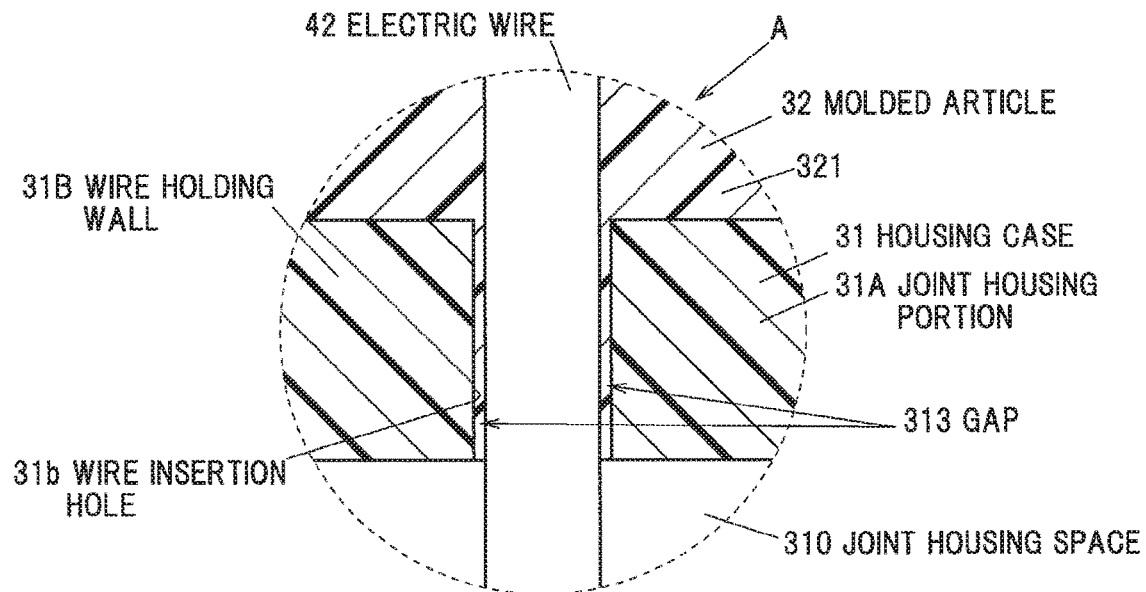
FIG. 4B is an enlarged view of a portion A.

FIGS. 4A and 4B are diagrams illustrating the sensor module 3, wherein FIG. 4A is a cutaway diagram in which the molded article and the housing case are shown as the cross section, and FIG. 4B is an enlarged view of a portion A.

As shown in FIGS. 2 and 4A, the magnetic field sensor 4 has a sensor main body 40 and plural (two in the first embodiment) lead wires 41 extending out of the sensor main body 40. The sensor main body 40 includes a magnetic field detecting element (Hall element) 40*a* which detects a magnetic flux density varying with rotation of the magnetic encoder 2. The plural lead wires 41 are respectively electrically connected to the electric wires 42 of the cable 43 by soldering or resistance welding, etc.

Plural joint 44, at which the plural lead wires 41 are electrically connected to the electric wires 42, are housed in the housing case 31. A portion of the housing case 31 and the plural electric wires 42 extending out of the housing case 31 are molded together with the molded article 32.

In the first embodiment, the molded article 32 is formed of a molding resin which is molded to cover at least a portion of the housing case 31 and not to come into contact with the sensor main body 40 of the magnetic field sensor 4. In more detail, the molded article 32 integrally has a main body portion 321 molded with a portion of the housing case 31 embedded therein, and a fixed portion 322 to be fixed to the knuckle 6 by the bolt 61. The molded article 32 is formed to cover an end of the cable 43.

By molding the molded article 32 so as not to come into contact with the sensor main body 40, it is possible to prevent the hot molding resin from affecting the sensor main body 40 at the time of forming the molded article 32, and thereby preventing defects such as a decrease in detection accuracy.

In the first embodiment, a sensor housing hole 323 which opens externally (opens on the opposite side to the cable extending side in this example) is provided on the molded article 32 at a front end thereof which is an end portion located opposite to the side where the cable 43 extends out. The sensor main body 40 of the magnetic field sensor 4 is arranged inside the sensor housing hole 323 without contact with the molded article 32. The molded article 32 is molded in a state that an end portion of the housing case 31 (a sensor holding wall 31C described later) is pressed against a mold which is arranged to cover the sensor main body 40 as well as the lead wires 41 located outside the housing case 31. Then, after removing the mold, the sensor housing hole 323 is formed.

By arranging the sensor main body 40 in the sensor housing hole 323 which opens externally, heat generated by the sensor main body 40 during use of the sensor module 3 can be released through the opening of the sensor housing hole 323 and overheating of the magnetic field sensor 4 is thereby prevented. Thus, a decrease in detection accuracy due to overheating of the magnetic field sensor 4 can be prevented.

Configuration of the Housing Case 31

FIGS. 5A to 5C are diagrams illustrating the housing case 31, wherein FIG. 5A is an exploded perspective view, FIG. 5B is a plan view when viewed from the side where the sensor main body 40 is provided (on the front end side of the sensor module 3), and FIG. 5C is a cross sectional view thereof.

As shown in FIGS. 4A, 4B and 5A to 5C, the housing case 31 is formed of, e.g., a hard resin such as ABS resin, and is composed of a combination of a first resin member 311 and a second resin member 312. The first resin member 311 and the second resin member 312 can be formed by, e.g., injection molding.

The first resin member 311 has a joint housing portion 311A which houses the plural joints 44. A recessed portion 311a for housing the plural joints 44 is formed on the joint housing portion 311A.

Likewise, the second resin member 312 has a joint housing portion 312A which houses the plural joints 44. A recessed portion 312a for housing the plural joints 44 is formed on the joint housing portion 312A.

A joint housing portion 31A of the housing case 31 is formed by combining the joint housing portion 311A of the first resin member 311 with the joint housing portion 312A of the second resin member 312. Then, a rectangular parallelepiped-shaped joint housing space 310 is formed by combining the recessed portion 311a of the first resin member 311 with the recessed portion 312a of the second resin member 312. The joint housing portion 31A is formed to surround the entire portions of the plural joints 44.

The joint housing portion 311A of the first resin member 311 has a wire holding wall 311B which holds the electric wires 42, and a sensor holding wall 311C which holds the lead wires 41 and thereby holds the magnetic field sensor 4. The wire holding wall 311B and the sensor holding wall 311C face each other with the recessed portion 311a interposed therebetween. Plural (two in this example) wire holding grooves 311b for holding the plural (two in this example) electric wires 42 are formed on the wire holding wall 311B. Plural (two in this example) lead wire holding grooves 311c for holding the plural (two in this example) lead wires 41 are formed on the sensor holding wall 311C.

Likewise, the joint housing portion 312A of the second resin member 312 has a wire holding wall 312B which holds the electric wires 42, and a sensor holding wall 312C which holds the lead wires 41 and thereby holds the magnetic field sensor 4. The wire holding wall 312B and the sensor holding wall 312C face each other with the recessed portion 312a interposed therebetween. Plural (two in this example) wire holding grooves 312b for holding the plural (two in this example) electric wires 42 are formed on the wire holding wall 312B. Plural (two in this example) lead wire holding grooves 312c for holding the plural (two in this example) lead wires 41 are formed on the sensor holding wall 312C.

A wire holding wall 31B of the joint housing portion 31A is formed by combining the wire holding wall 311B of the first resin member 311 with the wire holding wall 312B of the second resin member 312. Then, each of cylindrical wire insertion holes 31b for inserting the electric wires 42 is formed by combining the wire holding groove 311b of the first resin member 311 with the wire holding groove 312b of the second resin member 312.

Likewise, the sensor holding wall 31C of the joint housing portion 31A is formed by combining the sensor holding wall 311C of the first resin member 311 with the sensor holding wall 312C of the second resin member 312. Then, each of rectangular cylindrical lead wire insertion holes 31c for inserting the lead wires 41 is formed by combining the lead wire holding groove 311c of the first resin member 311 with the lead wire holding groove 312c of the second resin member 312. The shape of the lead wire insertion hole 31c can be appropriately changed according to the shape (cross-sectional shape) of the lead wire 41.

In the first embodiment, the joint housing portion 31A in a state after combining the two resin members 311 and 312 has a rectangular parallelepiped box shape. A space therein, which is surrounded by six walls, is the joint housing space 310. Then, one of the six walls is the wire holding wall 31B which holds the electric wires 42, and the wall facing the wire holding wall 31B is the sensor holding wall 31C which holds the magnetic field sensor 4. The plural wire insertion holes 31b for inserting the electric wires 42 are formed on the wire holding wall 31B, and the plural lead wire insertion holes 31c for inserting the lead wires 41 are formed on the sensor holding wall 31C.

Since the housing case 31 is provided, it is possible to form the molded article 32 in the state that the joints 44 are housed in the housing case 31, and damage on the joints 44 due to resin pressure at the time of forming the molded article 32 thus can be prevented.

Furthermore, even when a load such as tension or compression is externally applied to the electric wires 42 or the lead wires 41, the load can be prevented from being transmitted to the joints 44 since both the electric wires 42 and the lead wires 41 are held by the housing case 31. Thus, an impact of vibration on the joints 44 is reduced, and vibration resistance is thereby improved. In addition, even when the molded article 32 expands and contracts due to heat and a load such as tension or compression is applied to the electric wires 42, it is possible to prevent the load from affecting the joints 44, and resistance to temperature change (i.e., heat resistance) is thereby improved.

In the first embodiment, the magnetic field sensor 4 is arranged such that the lead wires 41 are held by the sensor holding wall 31C of the housing case 31 and the sensor main body 40 is held by the housing case 31 via the lead wires 41. In other words, in the first embodiment, the magnetic field sensor 4 is held by the housing case 31 in a cantilever manner. A portion of the sensor holding wall 31C can be seen from the outside (on the front end side) through the sensor housing hole 323 of the molded article 32, and portions of the lead wires 41 with the sensor main body 40 extend out of the externally-seen portion (a portion facing the sensor housing hole 323, a portion not covered with the molded article 32) of the sensor holding wall 31C and are arranged inside the sensor housing hole 323.

To prevent the sensor main body 40 from coming into contact with surrounding members and from being damaged during assembly, the entire sensor main body 40 is desirably arranged on the cable 43 extending side relative to the front end of the molded article 32 (i.e., arranged inside the sensor housing hole 323) and does not protrude beyond the front end of the molded article 32.

Meanwhile, in the first embodiment, a diameter of the wire insertion hole 31b is slightly larger than an outer diameter of the electric wire 42 to prevent an unwanted load from being applied to the electric wire 42 at the time of arranging the electric wire 42 so as to be held by the housing case 31. Likewise, the cross-sectional shape of the lead wire insertion hole 31c is slightly larger than the cross-sectional shape of the lead wire 41 to prevent an unwanted load from being applied to the lead wire 41 or the sensor main body 40 at the time of arranging the lead wire 41 so as to be held by the housing case 31.

In addition, in the first embodiment, the joint housing space 310 which is an internal space of the housing case 31 is not filled with the molding resin. In other words, the inside of the housing case 31 is hollow. In this configuration, the molding resin does not come into contact with the joints 44. Therefore, damage on the joints 44 due to resin pressure at the time of forming the molded article 32 can be further prevented.

Furthermore, in the first embodiment, gaps 313 between the electric wires 42 and the wire holding wall 31B are at least partially filled with the molding resin constituting the molded article 32, as shown in FIG. 4B. In other words, in the first embodiment, the molding resin (a portion of the molded article 32) gets into the gaps 313 between the electric wires 42 and the wire holding wall 31B. The molding resin desirably fills throughout the circumferences of the gaps 313 so that the gaps between the electric wires 42 and the wire holding wall 31B are sealed with the molding resin. In the first embodiment, the size of the gap 313 and the thickness of the wire holding wall 31B (the length of the wire insertion hole 31b) are appropriately adjusted so that the molding resin gets into the gap 313 and does not get in the joint housing space 310.

It is possible to firmly fix the electric wires 42 to the housing case 31 by filling the gaps 313 between the electric wires 42 and the wire holding wall 31B with the molding resin. Then, by firmly fixing the electric wires 42 to the housing case 31, it is possible to reduce a load applied to the joints 44 by vibration and to prevent defects such as contact of the electric wires 42 and the housing case 31 due to vibration, and vibration resistance is further improved. In addition, since the electric wires 42 are firmly fixed to the housing case 31, the joints 44 are more unlikely to be affected by expansion/contraction of the molded article 32 due to heat, and heat resistance is thereby further improved.

Although the lead wires 41 of the magnetic field sensor 4 are not in contact with the molded article 32 in the first embodiment, it is not limited thereto. The lead wires 41 may be in contact with the molded article 32. For example, the molded article 32 may be formed to cover the entire housing case 31 as well as portions of the lead wires 41 extending out of the housing case 31 (i.e., the molded article 32 may be present between the bottom of the sensor housing hole 323 and the housing case 31). In this case, it is possible to firmly fix the lead wires 41 (the magnetic field sensor 4) to the housing case 31 since the gap between the lead wires 41 and the sensor holding wall 32C is filled with the molding resin. It is possible to further improve vibration resistance and heat resistance by firmly fixing the lead wires 41 (the magnetic field sensor 4) to the housing case 31.

Functions and Effects of the Embodiment

As described above, in the rotation detector 1 as an onboard detector in the first embodiment, the housing case 31 has the joint housing portion 31A housing the plural joints 44 at which the plural electric wires 42 are electrically connected to the lead wires 41, the molded article 32 is formed of the molding resin which is molded to cover at least a portion of the housing case 31 and not to come into contact with the sensor main body 40, and the joint housing portion 31A has the wire holding wall 31B holding the electric wires 42 and the sensor holding wall 31C holding the lead wires 41 and thereby holding the magnetic field sensor 4.

By molding the molded article 32 so as not to come into contact with the sensor main body 40, it is possible to prevent heat of the molding resin at the time of molding from adversely affecting the magnetic field sensor 4 (possible to prevent, e.g., a decrease in detection accuracy) and thereby possible to improve reliability. In addition, by providing the housing case 31 for housing the joints 44, damage on the joints 44 caused by the resin injected at the time of molding the molded article 32 can be prevented. Furthermore, even when an external load is applied to the electric wires 42 or the lead wires 41, it is possible to prevent the load from affecting the joints 44 since the electric wires 42 and the lead wires 41 are held by the housing case 31, and it is thus possible to improve vibration resistance and heat resistance.

That is, in the first embodiment, it is possible to provide an onboard detector (the rotation detector 1) which is excellent in vibration resistance and heat resistance and is not affected by heat at the time of molding a resin and thus can avoid defects such as wire breakage.

Second Embodiment

Figure 6:
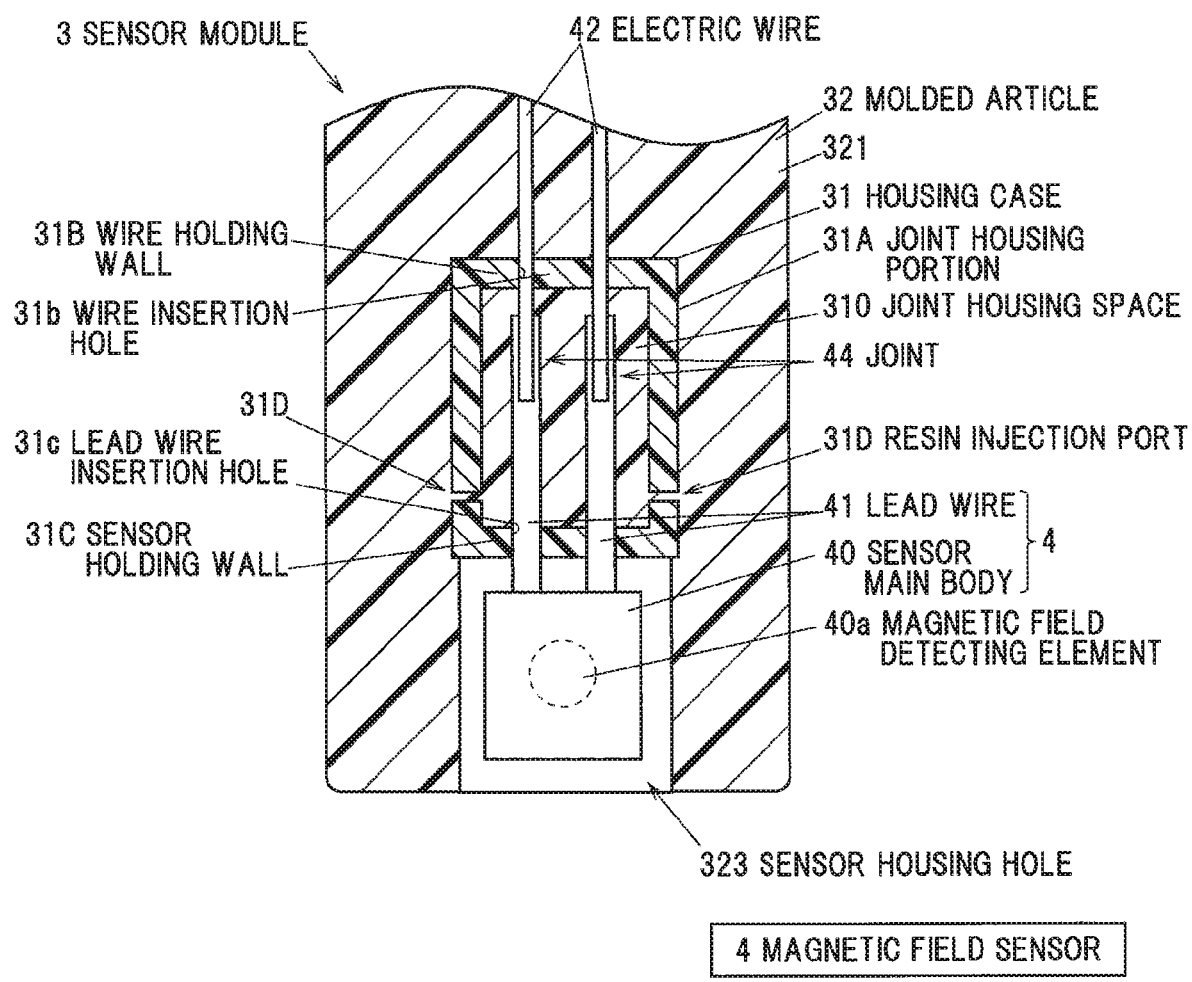
FIG. 6 is a cutaway diagram illustrating a sensor module in the second embodiment of the invention, in which a molded article and a housing case are shown as the cross section.

FIG. 6 is a cutaway diagram illustrating the sensor module 3 in the second embodiment of the invention, in which the molded article 32 and the housing case 31 are shown as the cross section.

As shown in FIG. 6, the second embodiment is based on the first embodiment shown in FIG. 4A but resin injection ports 31D for injecting the molding resin into the joint housing space 310 are formed on the joint housing portion 31A and the joint housing space 310 is filled with the molding resin.

Mechanical strength of the sensor module 3 can be improved by filling the joint housing space 310 with the molding resin as compared to when the joint housing space 310 is not filled with the molding resin.

In the second embodiment, although the molding resin reaches the joints 44, it is possible to reduce strength of the flow of the molding resin reaching the joints 44 by appropriately adjusting the positon or size of the resin injection port 31D, thereby preventing damage on the joints 44 due to resin pressure.

To further prevent damage on the joints 44 due to resin pressure, the resin injection ports 31D are desirably formed on a side opposite to the molding resin injecting position (on the mold) relative to the joints 44. For example, when the molding resin is injected from the cable 43 extending side relative to the joints 44, the resin injection ports 31D are desirably formed on the front end side relative to the joints 44. Although two resin injection ports 31D are formed in FIG. 6, the number of the resin injection ports 31D is not limited thereto.

In addition, in the second embodiment in which the joint housing space 310 is filled with the molding resin, the molding resin at least partially fills gaps between the lead wires 41 inserted through the lead wire insertion holes 31c of the housing case 31 and the sensor holding wall 31C around the lead wire insertion holes 31c. In other words, in the second embodiment, the molding resin (a portion of the molded article 32) gets into the gaps between the lead wires 41 and the sensor holding wall 31C. Thus, the lead wires 41 (the magnetic field sensor 4) is fixed to the housing case 31 more firmly, and vibration resistance and heat resistance are further improved.

The molding resin desirably fills throughout the circumferences of the gaps between the lead wires 41 and the sensor holding wall 31C such that the gaps between the lead wires 41 and the sensor holding wall 31C are sealed with the molding resin. In the second embodiment, the size of the gap and the thickness of the sensor holding wall 31C (the length of the lead wire insertion hole 31c) are appropriately adjusted so that the molding resin gets into the gap and is not ejected toward the sensor main body 40 (ejected into the sensor housing hole 323) through the lead wire insertion holes 31c.

Third Embodiment

Figure 7:
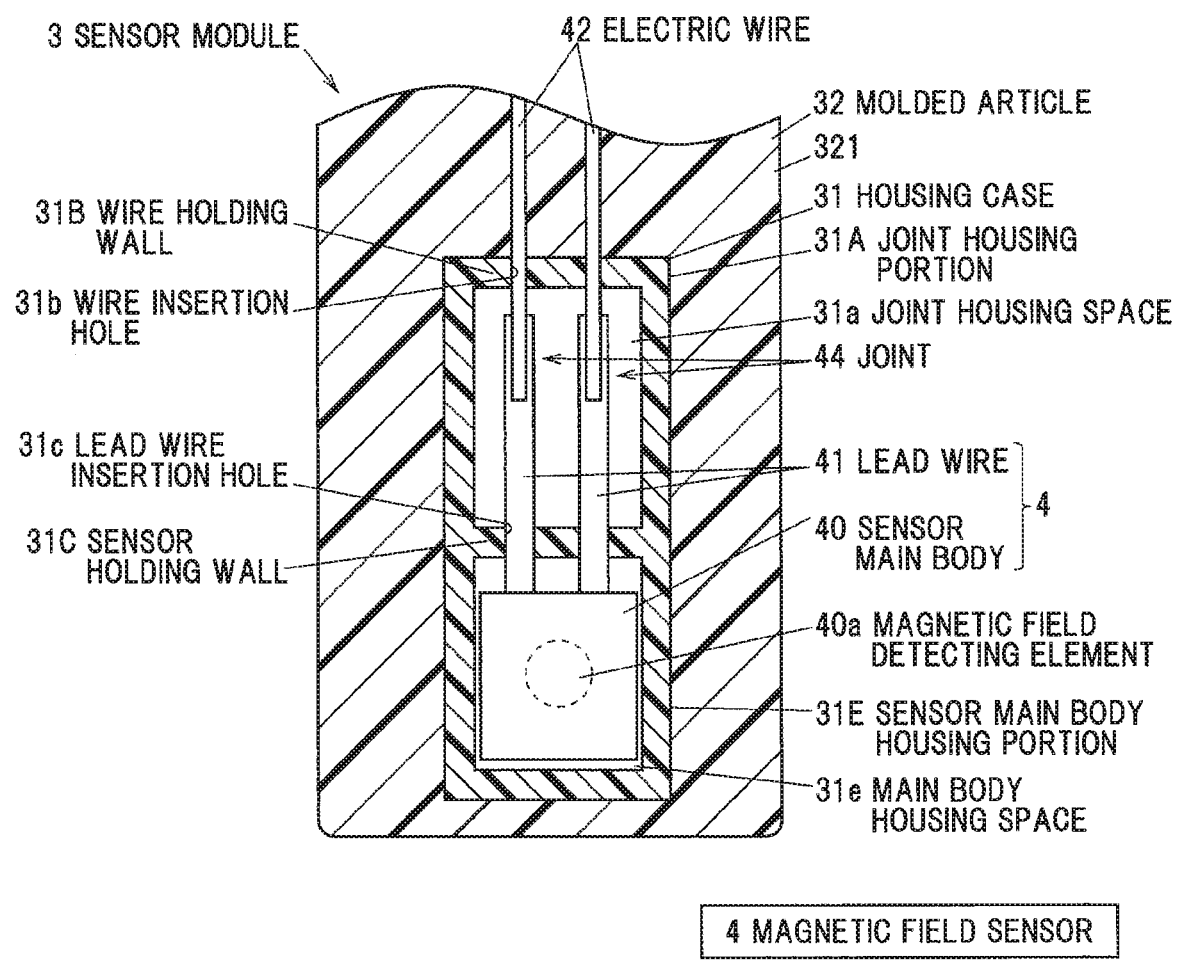
FIG. 7 is a cutaway diagram illustrating a sensor module in the third embodiment of the invention, in which a molded article and a housing case are shown as the cross section.

FIG. 7 is a cutaway diagram illustrating the sensor module 3 in the third embodiment of the invention, in which the molded article 32 and the housing case 31 are shown as the cross section.

As shown in FIG. 7, the third embodiment is based on the first embodiment shown in FIG. 4A but the housing case 31 is further provided with a sensor main body housing portion 31E which has a main body housing space 31e for housing the sensor main body 40. To avoid an impact of heat at the time of molding the molded article 32 on the sensor main body 40, the main body housing space 31e housing the sensor main body 40 is not filled with the molding resin.

In the third embodiment, the housing case 31 has a rectangular parallelepiped box shape as a whole, and the internal space thereof is divided into two spaces by the sensor holding wall 31C such that one of the internal spaces serves as a joint housing space 31a and the other internal space serves as the main body housing space 31e. The housing case 31 on the wire holding wall 31B side relative to the sensor holding wall 31C serves as the joint housing portion 31A, and the housing case 31 on the opposite side to the wire holding wall 31B relative to the sensor holding wall 31C serves as the sensor main body housing portion 31E. The sensor holding wall 31C constitutes a portion of the joint housing portion 31A and also a portion of the sensor main body housing portion 31E.

Since the housing case 31 has the sensor main body housing portion 31E, the mold used when molding the molded article 32 does not need to have a complicated shape designed to cover the sensor main body 40 and can be simplified, and the sensor module 3 can be manufactured more easily. Protrusions which protrude inside the main body housing space 31e may be additionally provided on the sensor main body housing portion 31E so that the sensor main body 40 is supported by the protrusions. In this case, it is possible to prevent a load due to vibration from being concentrated on the lead wires 41 or the housing case 31 around the lead wires 41 (the sensor holding wall 31C), thereby further improving vibration resistance.

Summary of the Embodiments

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] An onboard detector (1), comprising: a cable (43) comprising a plurality of electric wires (42); and a sensor module (3) provided at an end of the cable (43), wherein the sensor module (3) comprises a sensor (4), a housing member (31) and a molded article (32), the sensor (4) comprising a sensor main body (40) including a detecting element (40a) and a plurality of lead wires (41) extending out of the sensor main body (40) and electrically connected to the plurality of electric wires (42), the housing member (31) comprising a joint housing portion (31A) that houses a plurality of joints (44) at which the plurality of electric wires (42) are electrically connected to the plurality of lead wires (41), and the molded article (32) comprising a molding resin that is molded to cover at least a portion of the housing member (31) and not to come into contact with the sensor main body (40), and the joint housing portion (31A) comprises a wire holding wall (31B) holding the electric wires (42) and a sensor holding wall (31C) holding the lead wires (41) and thereby holding the sensor (4).

[2] The onboard detector (1) described in the [1], wherein a plurality of wire insertion holes (31b) for inserting the electric wires (42) are formed on the wire holding wall (31B), and the molding resin at least partially fills gaps (313) between the electric wires (42) inserted through the wire insertion holes (31b) and the wire holding wall (31B) around the wire insertion holes (31b).

[3] The onboard detector (1) described in the [1] or [2], wherein the joint housing portion (31A) is formed to entirely surround the plurality of joints (44) and comprises a joint housing space (310) that houses the plurality of joints (44), and the joint housing space (310) is not filled with the molding resin.

The onboard detector (1) described in the [1] or [2], wherein the joint housing portion (31A) is formed to entirely surround the plurality of joints (44) and comprises a joint housing space (310) that houses the plurality of joints (44), the joint housing portion (31A) comprises a resin injection port(s) (31D) for injecting the molding resin into the joint housing space (310), and the joint housing space (310) is filled with the molding resin.

[5] The onboard detector (1) described in any one of the [1] to [4], wherein a plurality of lead wire insertion holes (31c) for inserting the lead wires (41) are formed on the sensor holding wall (31C), and the molding resin at least partially fills gaps between the lead wires (41) inserted through the lead wire insertion holes (31c) and the sensor holding wall (31C) around the lead wire insertion holes (31c).

[6] The onboard detector (1) described in any one of the [1] to [5], wherein the molded article (32) comprises a sensor housing hole (323) that opens externally, and the sensor (4) is arranged such that the lead wires (41) are held by the sensor holding wall (31C) and the sensor main body (40) is thereby supported inside the sensor housing hole (323).

[7] The onboard detector (1) described in any one of the [1] to [5], wherein the housing member (31) further comprises a sensor main body housing portion (31E) comprising a main body housing space (31e) for housing the sensor main body (40), and the main body housing space (31e) is not filled with the molding resin.

Although the embodiments of the invention have been described, the invention according to claims is not to be limited to the embodiments. Further, please note that all combinations of the features described in the embodiments are not necessary to solve the problem of the invention.

The invention can be appropriately modified and implemented without departing from the gist thereof.

For example, although the sensor module 3 having one magnetic field sensor 4 has been described in the embodiments, it is not limited thereto. The sensor module 3 may be provided with plural magnetic field sensors 4. In this case, one housing case 31 may be shared by the plural magnetic field sensors 4, or a separate housing case 31 may be provided for each magnetic field sensor 4.

In addition, although a Hall element which detects a magnetic field is used as a detecting element in the embodiments, it is not limited thereto. The detecting element may be an element which detects state quantity, e.g., temperature, humidity, acceleration rate or pressure, etc.

What is claimed is:

1. An onboard detector, comprising:
a cable comprising a plurality of electric wires; and
a sensor module provided at an end of the cable,
wherein the sensor module comprises a sensor, a housing member and a molded article,
wherein the sensor comprises a sensor main body including a detecting element and a plurality of lead wires extending out of the sensor main body and electrically connected to the plurality of electric wires,
wherein the housing member comprises a joint housing portion that houses a plurality of joints at which the plurality of electric wires are electrically connected to the plurality of lead wires, wherein the molded article comprises a molding resin that is molded so as to cover at least a portion of the housing member and so as not to come into contact with the sensor main body, wherein the joint housing portion comprises a wire holding wall holding the electric wires and a sensor holding wall holding the lead wires so as to hold the sensor, and wherein the joint housing portion is formed to entirely surround the plurality of joints and comprises a joint housing space that houses the plurality of joints, the joint housing portion comprises a resin injection port(s) for injecting the molding resin into the joint housing space, and the joint housing space is filled with the molding resin.

2. The onboard detector according to claim 1, wherein a plurality of wire insertion holes for inserting the electric wires are formed on the wire holding wall, and the molding resin at least partially fills gaps between the electric wires inserted through the wire insertion holes and the wire holding wall around the wire insertion holes.

3. The onboard detector according to claim 1, wherein the housing member further comprises a sensor main body housing portion comprising a main body housing space for housing the sensor main body, and the main body housing space is not filled with the molding resin.

4. An onboard detector, comprising:
a cable comprising a plurality of electric wires; and
a sensor module provided at an end of the cable,
wherein the sensor module comprises a sensor, a housing member and a molded article,
wherein the sensor comprises a sensor main body including a detecting element and a plurality of lead wires extending out of the sensor main body and electrically connected to the plurality of electric wires,
wherein the housing member comprises a joint housing portion that houses a plurality of joints at which the plurality of electric wires are electrically connected to the plurality of lead wires,
wherein the molded article comprises a molding resin that is molded so as to cover at least a portion of the housing member and so as not to come into contact with the sensor main body,
wherein the joint housing portion comprises a wire holding wall holding the electric wires and a sensor holding wall holding the lead wires so as to hold the sensor, and
wherein a plurality of lead wire insertion holes for inserting the lead wires are formed on the sensor holding wall, and the molding resin at least partially fills gaps between the lead wires inserted through the lead wire insertion holes and the sensor holding wall around the lead wire insertion holes.

5. The onboard detector according to claim 4, wherein the joint housing portion is formed to entirely surround the plurality of joints and comprises a joint housing space that houses the plurality of joints, and the joint housing space is not filled with the molding resin.

6. The onboard detector according to claim 4, wherein a plurality of wire insertion holes for inserting the electric wires are formed on the wire holding wall, and the molding resin at least partially fills gaps between the electric wires inserted through the wire insertion holes and the wire holding wall around the wire insertion holes.

7. The onboard detector according to claim 4, wherein the housing member further comprises a sensor main body housing portion comprising a main body housing space for housing the sensor main body, and the main body housing space is not filled with the molding resin.

8. An onboard detector, comprising:
a cable comprising a plurality of electric wires; and
a sensor module provided at an end of the cable,
wherein the sensor module comprises a sensor, a housing member and a molded article,
wherein the sensor comprises a sensor main body including a detecting element and a plurality of lead wires extending out of the sensor main body and electrically connected to the plurality of electric wires,
wherein the housing member comprises a joint housing portion that houses a plurality of joints at which the plurality of electric wires are electrically connected to the plurality of lead wires,
wherein the molded article comprises a molding resin that is molded so as to cover at least a portion of the housing member and so as not to come into contact with the sensor main body,
wherein the joint housing portion comprises a wire holding wall holding the electric wires and a sensor holding wall holding the lead wires so as to hold the sensor, and
wherein the molded article comprises a sensor housing hole that opens externally, at least a portion of the sensor holding wall of the housing member can be seen from the outside through the sensor housing hole, and the sensor is arranged such that the lead wires are held by the sensor holding wall and the sensor main body is thereby supported inside the sensor housing hole.

9. The onboard detector according to claim 8, wherein a plurality of wire insertion holes for inserting the electric wires are formed on the wire holding wall, and the molding resin at least partially fills gaps between the electric wires inserted through the wire insertion holes and the wire holding wall around the wire insertion holes.

10. The onboard detector according to claim 8, wherein the joint housing portion is formed to entirely surround the plurality of joints and comprises a joint housing space that houses the plurality of joints, and the joint housing space is not filled with the molding resin.

* * * * *